(12) United States Patent
Yeh

(10) Patent No.: US 8,391,028 B2
(45) Date of Patent: Mar. 5, 2013

(54) CONTROL METHODS FOR SWITCHING POWER SUPPLIES

(75) Inventor: Wen-Chung Yeh, Hsin-Chu (TW)

(73) Assignee: Leadtrend Technology Corp., Science-Based Industrial Park, Hsin-Chu (TW)

( * ) Notice: Subject to any disclaimer, the term of this patent is extended or adjusted under 35 U.S.C. 154(b) by 353 days.

(21) Appl. No.: 12/786,373

(22) Filed: May 24, 2010

(65) Prior Publication Data

US 2010/0321956 A1   Dec. 23, 2010

(30) Foreign Application Priority Data

Jun. 19, 2009   (TW) ................................ 98120618 A

(51) Int. Cl.
  *H02M 3/335* (2006.01)
(52) U.S. Cl. .................................. 363/21.05; 363/21.13
(58) Field of Classification Search ............... 363/21.09, 363/21.05, 21.13, 21.17, 131
  See application file for complete search history.

(56) References Cited

U.S. PATENT DOCUMENTS 7,729,145 B2 *  6/2010   Takashima ...................... 363/87

* cited by examiner

*Primary Examiner* — Shawn Riley
(74) *Attorney, Agent, or Firm* — Winston Hsu; Scott Margo

(57) ABSTRACT

An embodiment provides a control method capable of controlling a switching-mode power supply to provide an output power source. The switching-mode power supply has a winding coupled to an input power source and controlled by a switch to be energized or de-energized. The maximum current peak through the winding is set to be a predetermined value. A discharge time of the winding in a switching cycle period is detected. The switching cycle period of the switch is controlled to keep the ratio of the discharge time to the switching cycle period as a constant.

19 Claims, 15 Drawing Sheets

CONTROL METHODS FOR SWITCHING POWER SUPPLIES

BACKGROUND OF THE INVENTION

1. Field of the Invention

The present invention is related to a switching-mode power supply (SMPS) and the operation method thereof.

2. Description of the Prior Art

SMPS is utilized extensively in the current consumer electronic devices. SMPS controls the windings to be energized and de-energized through a power switch for providing an output power source of desired specification. For instance, when at light load or no load, SMPS may operate in constant voltage mode, providing a substantial constant voltage source independent to the output current; alternatively, when at heavy load, SMPS may operate in constant current mode, providing a roughly constant current source independent to the output voltage.

FIG. 1 is a diagram illustrating conventional SMPS 10 of a flyback topology, capable of operating in the constant voltage mode or the constant current mode using primary side control. Bridge rectifier 12 roughly rectifies alternating-current (AC) power source $V_{AC}$ to input power source $V_{IN}$. Primary winding 24 of transformer 20, power switch 15, and current detection resistor 36 are coupled in series between input power source $V_{IN}$ and a ground terminal. When switch controller 18 turns on power switch 15, primary winding 24 energizes; when switch controller 18 turns off power switch 15, transformer 20 de-energizes through secondary winding 22 and auxiliary winding 25. Rectifier 16 and capacitor 13 roughly rectify the electrical energy released from secondary winding 22 and provide output power source $V_{OUT}$ to output load 38. Rectifier 28 and capacitor 34 roughly rectify the electrical energy released from auxiliary winding 25 and thus provide operation power source $V_{CC}$ to switch controller 18. Startup resistor 26 provides the current required to build up voltage of operation power source $V_{CC}$ during a startup period of time. Voltage dividing resistors 30 and 32 forward to switch controller 18 divided voltage by dividing the reflective voltage across auxiliary winding 25, which, when transformer 20 de-energizes, corresponds approximately to the voltage across secondary winding 22. By detecting the reflective voltage through pin FB, switch controller 18 is able to monitor the voltage across secondary winding 22 and accordingly controls power switch 15.

FIG. 2 is a diagram illustrating a partial circuitry of conventional switch controller 18a in constant voltage mode. When power switch 15 is turned off, sample/hold circuit 42 samples the voltage of pin FB and generates feedback voltage $V_{FB}$. Error amplifier 44 compares feedback voltage $V_{FB}$ with reference voltage $V_{REF1}$ to generate compensation voltage $V_{COM}$. Comparator 50 compares compensation voltage $V_{COM}$ with detection voltage $V_{CS}$ on pin CS. Comparator 52 compares current limiting voltage $V_{CS-LIMIT}$ with detection voltage $V_{CS}$. The outputs of comparators 50 and 52, as well as the clock output of oscillator 46, are all coupled to gate logic controller 48, which accordingly controls power switch 15 via pin GATE. In addition, if voltage of output power source $V_{OUT}$ is well regulated, feedback voltage $V_{FB}$ is virtually equal to reference voltage $V_{REF1}$ due to the negative feedback loop.

Circuitries relative to constant current mode are not shown in FIG. 2, as various SMPS of constant current mode and the control method thereof are already disclosed in the known art, such as U.S. Pat. No. 7,016,204 "Close-loop PWM Controller for Primary-side Controlled Power Converters", U.S. Pat. No. 7,388,764 "Primary Side Constant Output Current Controller", U.S. Pat. No. 7,110,270 "Method and Apparatus for Maintaining a Constant Load Current with Line Voltage in a Switch Mode Power Supply", and U.S. Pat. No. 7,505,287 "On-time Control for Constant Current Mode in a Flyback Power Supply" etc.

SUMMARY OF THE INVENTION

The present invention discloses a control method, for controlling a switching power supply. The switching power supply comprises a transformer which is coupled to an input power source. The transformer is controlled by a switch for charging or discharging to generate an output power source. The control method comprises providing a capacitor; storing a difference between a real electric charge and an expected electric charge in the capacitor, wherein the real electric charge corresponds to the total electric charge flowing through the transformer within a switching cycle period of the switch, and the expected electric charge corresponds to the electric charge expected in the switching cycle period; and varying the real electric charge or the expected electric charge in a subsequent switching cycle period according to a voltage of the capacitor, to cause the real electric charge approximately equal to the estimated electric charge in the subsequent switching cycle period.

The present invention further discloses a constant current control method for a switching power supply. The switching power supply comprises a switch and a winding coupled in series to an input power source. The switching power supply provides an output power source. The constant current control method comprises providing a first negative feedback loop, for detecting a winding current flowing through the winding so as to generate an estimated average current corresponding to an average current flowing through the winding; and providing a second negative feedback loop, for making an average output current of the output power source approximately equal to a predetermined average output current according to the estimated average current.

The present invention further discloses a method for generating a real current source for representing an average current of a winding in a switching power supply. The method comprises detecting a winding current which flows through the winding, so as to generate a detection voltage; comparing the detection voltage and an average voltage; charging or discharging a capacitor based on the difference between the detection voltage and the average voltage; varying the average voltage according to a voltage of the capacitor; and generating the real current source according to the average voltage.

The present invention further discloses a control method for controlling an output power source of a switching power supply. The switching power supply comprises a winding coupled to an input power source. The winding is controlled by a switch for charging or discharging. The control method comprises controlling a peak current flowing through the winding to be a predetermined value; detecting a discharge time of the winding within a switching cycle period; and controlling a switching cycle period of the switch, for a ratio between the discharge time and the switching cycle period of the switch to approximately equal to a constant value.

The present invention further discloses a constant current and constant voltage power converter. The constant current and constant voltage power converter comprises a constant current feedback loop and a constant voltage feedback loop; wherein a compensation capacitor is a common part for both of the constant current feedback loop and the constant voltage feedback loop.

The present invention further discloses a switch controller for a switching power supply. The switching power supply is coupled to an input power source. The transformer is controlled by a switch for charging or discharging to generate an output power source. The switch controller comprises a capacitor, a real current source, an expected current source and a feedback device. The real current source corresponds to a real current flowing through the transformer for charging the capacitor, so as to generate areal electric charge within a switching cycle period. The expected current source corresponds to an expected current for discharging the capacitor, so as to generate an expected electric charge within a switching cycle period. The feedback device is for varying the real electric charge or the expected electric charge according to a voltage of the capacitor, to cause the estimated electric charge approximately equal to the real electric charge in a subsequent switching cycle period.

The present invention further discloses a switch controller for a switching power supply. The switching power supply comprises a switch and a winding coupling in series to an input power source. The switching power supply provides an output power source. The switching power supply comprises a first negative feedback loop and a constant current controller. The first negative feedback loop is for detecting a winding current which flows through the winding, so as to generate an estimated average current corresponding to an average current flowing through the winding. The constant current controller is for forming a second negative feedback loop, for making an average output current of the output power source approximately equal to a predetermined average output current, according to the estimated average current.

The present invention further discloses an average voltage detector for a switching power supply which comprises a winding and a current detector. The current detector detects a current which flows through the winding for generating a detection voltage. The average voltage detector comprises a capacitor, a charging current source, a discharging current source and an updating device. The charging current source is for charging the capacitor. The discharging current source is for discharging the capacitor. The updating device is for generating an average voltage according to a voltage of the capacitor; wherein when the detection voltage is higher than the average voltage, the capacitor is charged, and when the detection voltage is lower than the average voltage, the capacitor is discharged.

The present invention further discloses a method, for a peak voltage across a detection point to approximately equal a predetermined value. The method comprises enabling a voltage level of the detection point to periodically increase from a lowest level; when the voltage level of the detection point is higher than the predetermined value, providing a charging current to charge a capacitor; and providing a discharging current for discharging the capacitor, wherein the charging current is greater than the discharging current.

These and other objectives of the present invention will no doubt become obvious to those of ordinary skill in the art after reading the following detailed description of the preferred embodiment that is illustrated in the various figures and drawings.

DETAILED DESCRIPTION

Further objects of the present invention and more practical merits obtained by the present invention will become more apparent from the description of the embodiments which will be given below with reference to the accompanying drawings. For explanation purposes, components with equivalent or similar functionalities are represented by the same symbols. Hence components of different embodiments with the same symbol are not necessarily identical. Here, it is to be noted that the present invention is not limited thereto.

Figure 3:
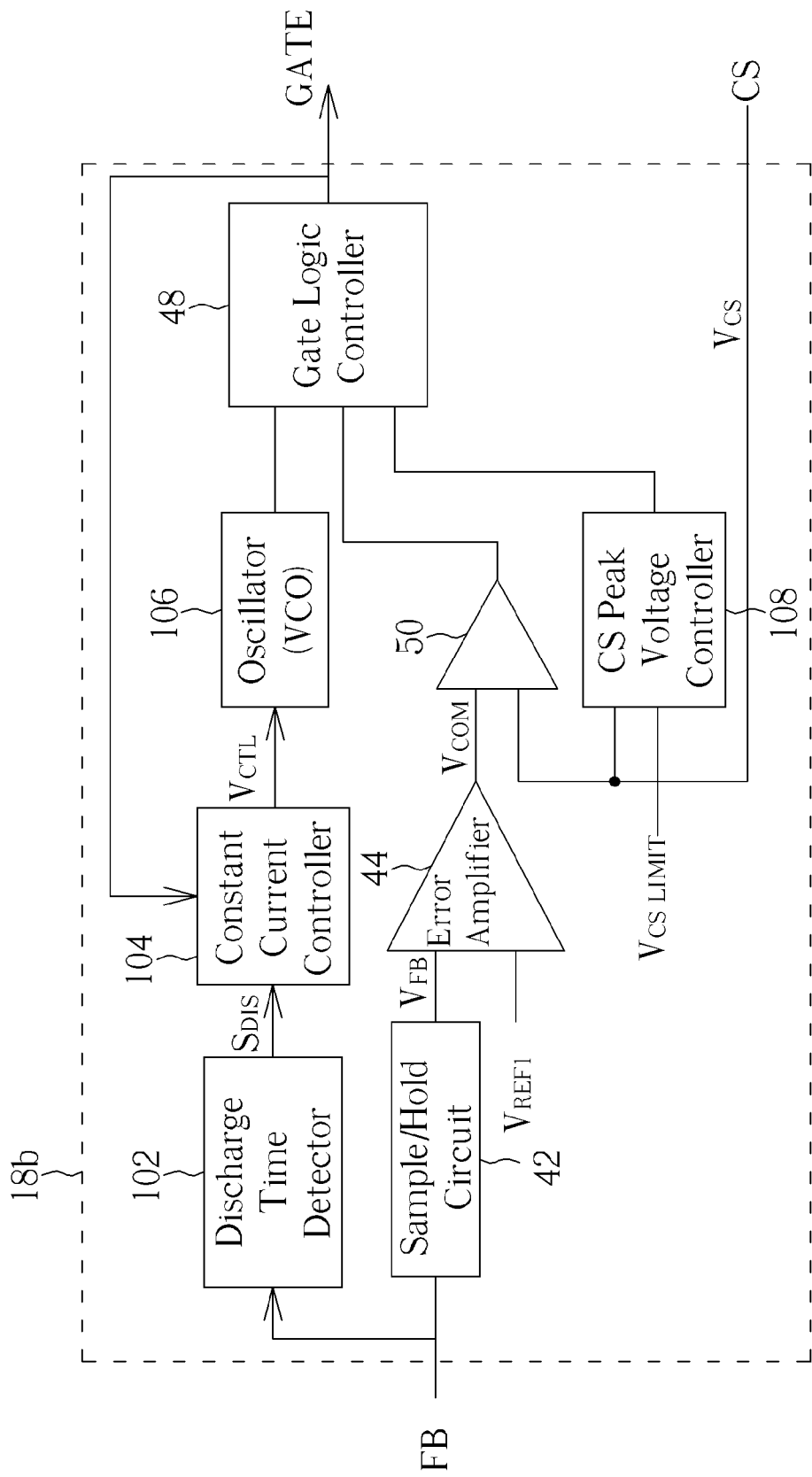
FIG. 3 is a diagram illustrating switch controller according to the present application.

FIG. 3 is a diagram illustrating switch controller 18b according to the present application. Switch controller 18b is meant to replace conventional switch controller 18 illustrated in FIG. 1 for implementing constant current/constant voltage operations. The following description is based on the assumption that switch controller 18b of FIG. 3 is disposed in setups similar to or the same with FIG. 1, and SMPS 10 of FIG. 1 operates in discontinuous conduction mode (DCM), meaning that transformer 20 de-energizes completely every switching cycle period.

Figure 2:
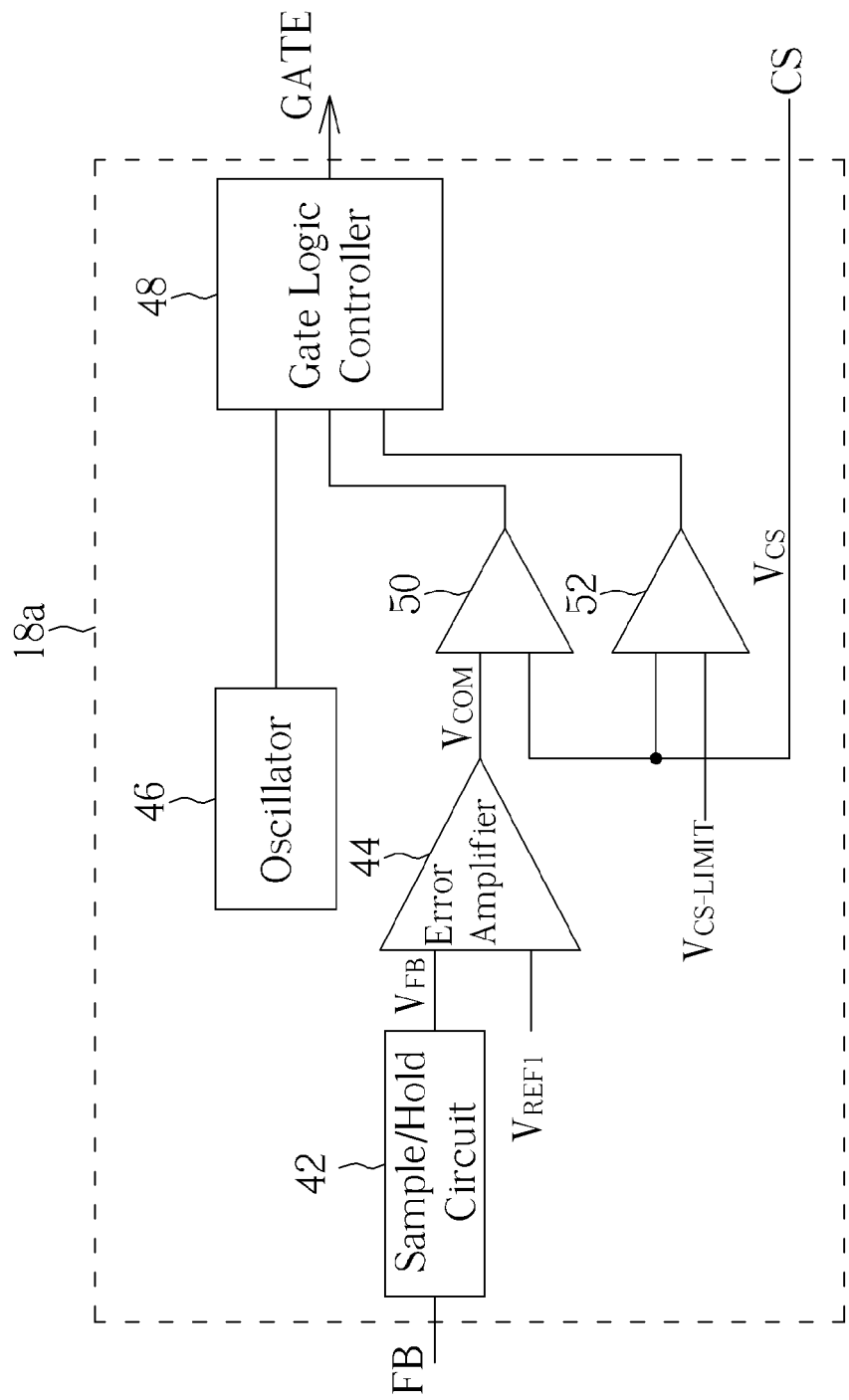
FIG. 2 is a diagram illustrating a partial circuitry of conventional switch controller in constant voltage mode.

The operation of constant voltage control for switch controller 18b is similar to that of switch controller 18a in FIG. 2, and can be inferred according to FIG. 2 by those skilled in the art; the relative description is omitted hereafter.

The difference between FIGS. 3 and 2 is that switch controller 18b in FIG. 3 comprises current sense (CS) peak voltage controller 108, discharge time detector 102, constant current controller 104, and voltage-controlled oscillator (VCO) 106, the cooperation of which can make current output load 38 effectively be supplied with a predetermined constant current $I_{OUT-SET}$. CS peak voltage controller 108 effectively controls the SEC peak current flowing through secondary winding 22 to be at most a predetermined value $I_{SEC-SET}$. By detecting through pin FB the falling of induced voltage $V_{AUX}$ across auxiliary winding 25, discharge time detector 102 generates discharging signal $S_{DIS}$, which implies discharge time $T_{DIS}$ of secondary winding 22. Based on discharge time $T_{DIS}$ indicated by discharging signal $S_{DIS}$ and the switching cycle period T received from pin Gate, constant current controller 104 identifies, during the present switching cycle period T, if the electrical charge outputted from secondary winding 22 is equal to the expected electrical charge generated from the predetermined constant current $I_{OUT-SET}$. If variations exist, control voltage $V_{CTL}$ is altered so that the clock frequency outputted by VCO 106 is accordingly adjusted. The adjusted clock frequency influences the subsequent switching cycle period T, consequently affecting the expected electrical charge in the subsequent switching cycle period T. A negative feedback loop formed therein soon makes the total estimated electrical charge in one switching cycle period approximately converge to the electrical charge output from secondary winding 22 in the same switching cycle period. Therefore, such negative feedback loop allows the average output current of secondary winding 22 to approximately converge to the predetermined constant current $I_{OUT-SET}$, achieving the purpose of constant current control.

Figure 1:
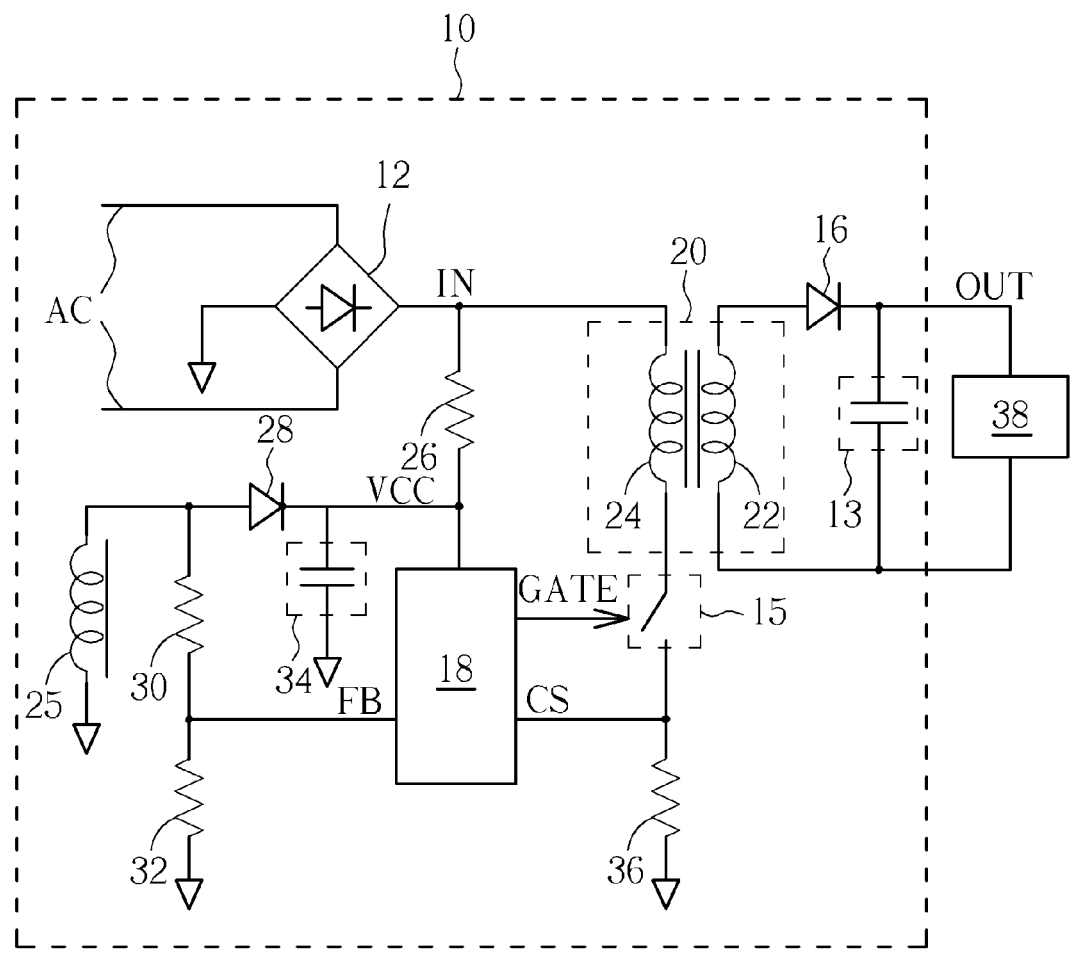
FIG. 1 is a diagram illustrating conventional SMPS.

CS peak voltage controller 108 controls the CS peak current, which flows through current detection resistor 36 and also primary winding 24 in FIG. 1, to be at most a predetermined value $I_{PRI-SET}$. Since the ratio of the CS peak current to the SEC peak current equals the winding ratio between secondary winding 22 and primary winding 24, CS peak voltage controller 108 equivalently controls the maximum SEC peak current to be the predetermined value $I_{SEC-SET}$. For instances, CS peak voltage controller 108 can restrain the CS peak voltage of the detection voltage $V_{CS}$ to be not more than limiting voltage $V_{CS-LIMIT}$, which, for example, is 0.85V. Embodiments of CS peak voltage controller 108 are disclosed by U.S. patent application Ser. No. 12/275,201, Taiwan patent application No. 097129355 and China patent application number No. 200810131240, all of which are here incorporated by reference. In the above-mentioned applications, CS peak voltage controller 108 determines the difference between the CS peak voltage of detection voltage $V_{CS}$ of present and the current limiting voltage $V_{CS-LIMIT}$, and then adjusts comparison voltage $V_{CS-USE}$ used to compare with the detection voltage $V_{CS}$ so that the CS peak voltage changes and gradually converges to current limiting voltage $V_{CS-LIMIT}$ in the subsequent switching cycle periods. Accordingly, the SEC peak current (of secondary winding 22) will be approximately equal to the predetermined value $I_{SEC-SET}$.

Figure 19:
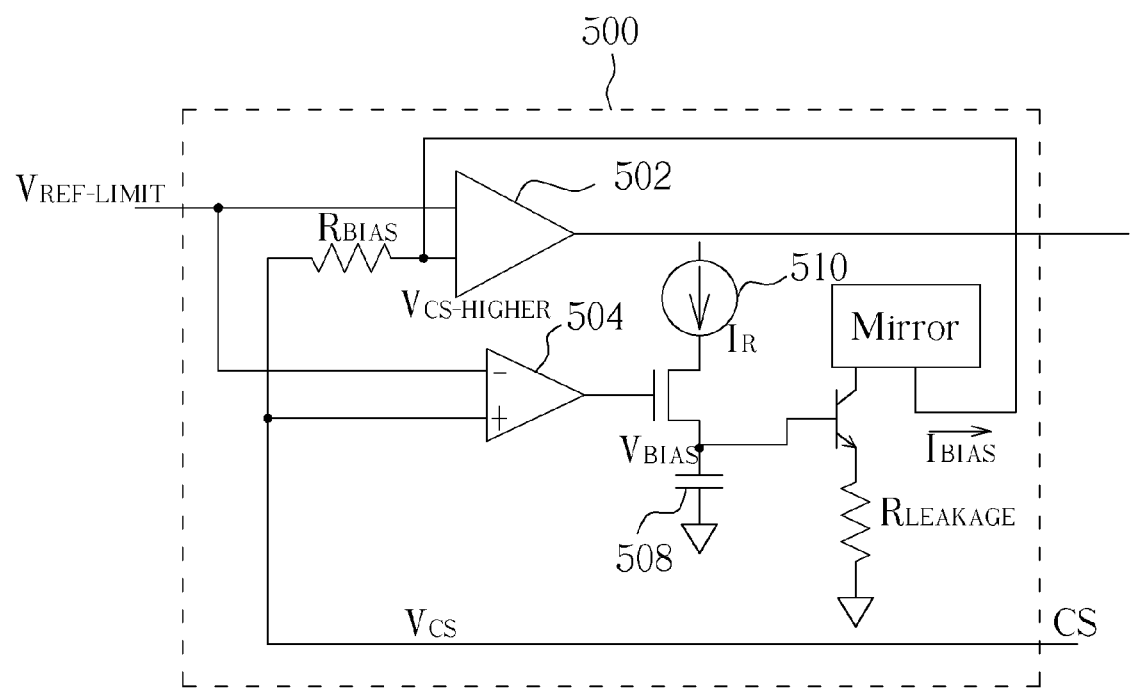
FIG. 19 is a diagram illustrating another embodiment of current sense peak value controller.

FIG. 19 is a diagram illustrating another embodiment of CS peak voltage controller 500, by which the CS peak voltage is restrained approximately to peak voltage limiting voltage $V_{REF-LIMIT}$. When utilized as CS peak value controller 108 in FIG. 3, CS peak voltage controller 500 in FIG. 19 may receive current limiting voltage $V_{CS-LIMIT}$ of FIG. 3 as peak voltage limiting voltage $V_{REF-LIMIT}$. In another embodiment, CS peak voltage controller 500 in FIG. 19 may receive current limiting voltage $V_{CS-LIMIT}$ of FIG. 3 as peak voltage limiting voltage $V_{REF-LIMIT}$.

In FIG. 19, if detection voltage $V_{CS}$ in FIG. 19 is greater than peak voltage limiting voltage $V_{REF-LIMIT}$ in a switching cycle period, capacitor 508 is charged by current source 510 and voltage $V_{BIAS}$ is pulled up accordingly. Since higher voltage $V_{BIAS}$ corresponds to higher current $I_{BIAS}$ flowing through resistor $R_{BIAS}$, comparator 502, in the next switching cycle period, earlier turns off the current through primary winding 24 and the CS peak voltage becomes lower. If the CS peak voltage in FIG. 19 is lower than peak voltage limiting voltage $V_{REF-LIMIT}$ in a switching cycle period, capacitor 508 is discharged with a very little current through BJT and resistor $R_{LEAKAGE}$, slightly lowering the voltage $V_{BIAS}$ so as to slightly pull up the CS peak voltage in the next switching cycle period. Current $I_R$ of current source 510 could be designed much greater than the leakage current of capacitor 508 caused by the BJT, thus the CS peak voltage approximately equals peak voltage limiting voltage $V_{REF-LIMIT}$ after a few switching cycle periods.

Figure 4:
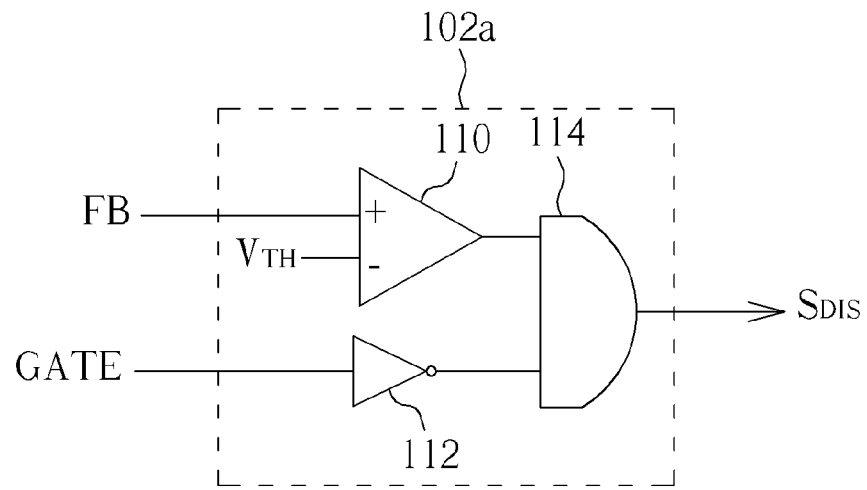
FIG. 4 is a diagram illustrating discharge time detector.

FIG. 4 is a diagram illustrating discharge time detector 102a. When discharging signal $S_{DIS}$ is of a high logic level, transformer 20 in FIG. 1 is still discharging to capacitor 13 and output load 38 through rectifier 16. When transformer 20 has completed discharging, the voltage at pin FB drops abruptly, and the drop can be detected as an indication to identify the completion of discharging of transformer 20, so the duration of discharge time $T_{DIS}$ can then be determined. In FIG. 4, comparator 110 compares the voltage at pin FB and threshold voltage $V_{TH}$. Moreover, discharge time $T_{DIS}$ is present only when power switch 15 is turned off, therefore in FIG. 4, the two input ends of AND gate 114 are coupled individually to the output of comparator 110 and the output of inverter 112. The input of inverter 112 is coupled to pin GATE.

Figure 5:
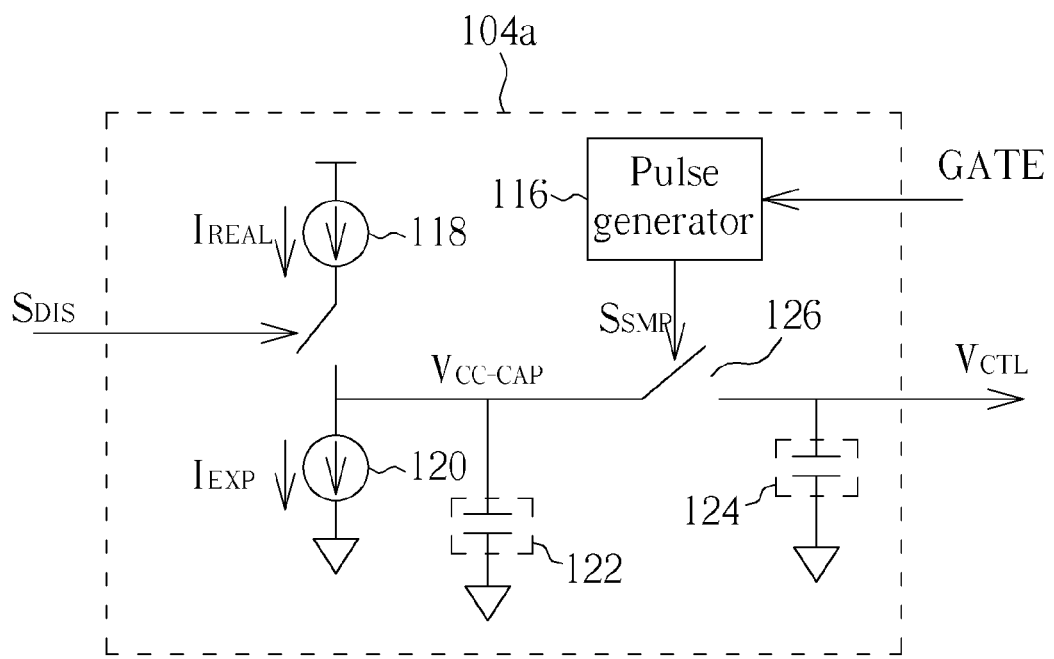
FIG. 5 is a diagram illustrating constant current controller.

FIG. 5 is a diagram illustrating constant current controller 104a. The current ratio ($I_{REAL}/I_{EXP}$) of real current source 118 and expected current source 120 is a predetermined value $N_{RATIO}$. When discharging signal $S_{DIS}$ is of a high logic level (i.e. the discharge time $T_{DIS}$ is present), real current source 118 charges capacitor 122. And the electric charge charged into charge capacitor 122 during the discharge time $T_{DIS}$ is called real electric charge $Q_{REAL}$. On the other hand, during the switching cycle period T, the electric charge discharged from charge capacitor 122 through current source 120 is called estimated electric charge $Q_{EST}$. Pulse generator 116 is triggered, for example, at the rising-edge of the voltage at pin GATE, to transmit pulse signal $S_{SMP}$ for capacitor 124 sampling voltage $V_{CC-CAP}$ of sampling capacitor 122 through switch 126, so as to generate control voltage $V_{CTL}$.

In one embodiment of the present invention, the oscillation frequency of VCO 106 in FIG. 3 decreases, or switching cycle period T increases as the voltage level of control voltage $V_{CTL}$ increases.

Since CS peak voltage controller 108 restrains the SEC peak current (flowing through secondary winding 22) to be not more than predetermined value $I_{SEC-SET}$, when constant current control is activated, the SEC peak current can be assumed to be predetermined value $I_{SEC-SET}$. During a switching cycle period T, the electric charge $Q_{SEC}$ outputted by secondary winding 22 can be calculated by formula (1) below:

$$Q_{SEC} = 0.5 * I_{SEC-SET} * T_{DIS} \qquad (1)$$

Desired constant current $I_{OUT-SET}$, which constant current control would like to achieve, is expected to drain in a switching cycle period T from secondary winding 22 expected output electric charge $Q_{OUT}$, which can be calculated by formula (2) below:

$$Q_{OUT} = I_{OUT-SET} * T \qquad (2)$$

The purpose of the constant current control is to make electric charge $Q_{SEC}$ (outputted by secondary winding 22) equal to expected output electric charge $Q_{OUT}$, in other words;

$$0.5 * I_{SEC-SET} * T_{DIS} = I_{OUT-SET} * T.$$

As illustrated in FIG. 5, if the current value ratio $N_{RATIO}$ (equivalent to $I_{REAL}/I_{EXP}$) is designed to equal to ($0.5 * I_{SEC-SET}/I_{OUT-SET}$), so the variation of voltage $V_{CC-CAP}$, defined as $\Delta V_{CC-CAP}$, after one switching cycle period can be inferred from the formula below:

$\Delta V_{CC-CAP}$ $= (Q_{REAL} - Q_{EXP})/C_{CC-CAP}$ $= (I_{REAL} * T_{DIS} - I_{EXP} * T) * K_1$ $= (0.5 * I_{SEC-SET} * T_{DIS} - I_{OUT-SET} * T) * K_2$ (3)

$= (Q_{SEC} - Q_{OUT}) * K2$ (4)

wherein $K_1$ and $K_2$ are constants, $Q_{REAL}$ the charge contributed by current source 118, $Q_{Exp}$ the charge contributed by current source 120, and $C_{CC-CAP}$ the capacitance of capacitor 122. If voltage $V_{CC-CAP}$ increases after present switching cycle period T, i.e. $\Delta V_{CC-CAP}$ greater than zero, it can be concluded that electric charge $Q_{SEC}$ outputted by secondary winding 22 exceeds expected output electric charge $Q_{OUT}$ in present switching cycle period T according to formula (4), implying the actual output current is greater than desired constant current $I_{OUT-SET}$. Moreover, the increasing of voltage $V_{CC-CAP}$ induces control voltage $V_{CTL}$ to increase, further increasing the period of a subsequent switching cycle, making $\Delta V_{CC-CAP}$ in the subsequent decrease. In this way, a negative feedback loop is formed. With appropriate designs, the negative feedback loop prompts the result of formulae (4) and (5) to converge to 0 over time. By adjusting switching cycle period T, the negative feedback loop converges $T/T_{DIS}$ to approximately equal to $N_{RATIO}$ (equivalent to $I_{REAL}/I_{EXP}$), making $Q_{SEC}-Q_{OUT}=0$ and achieving the purpose of outputting constant current.

Figure 6:
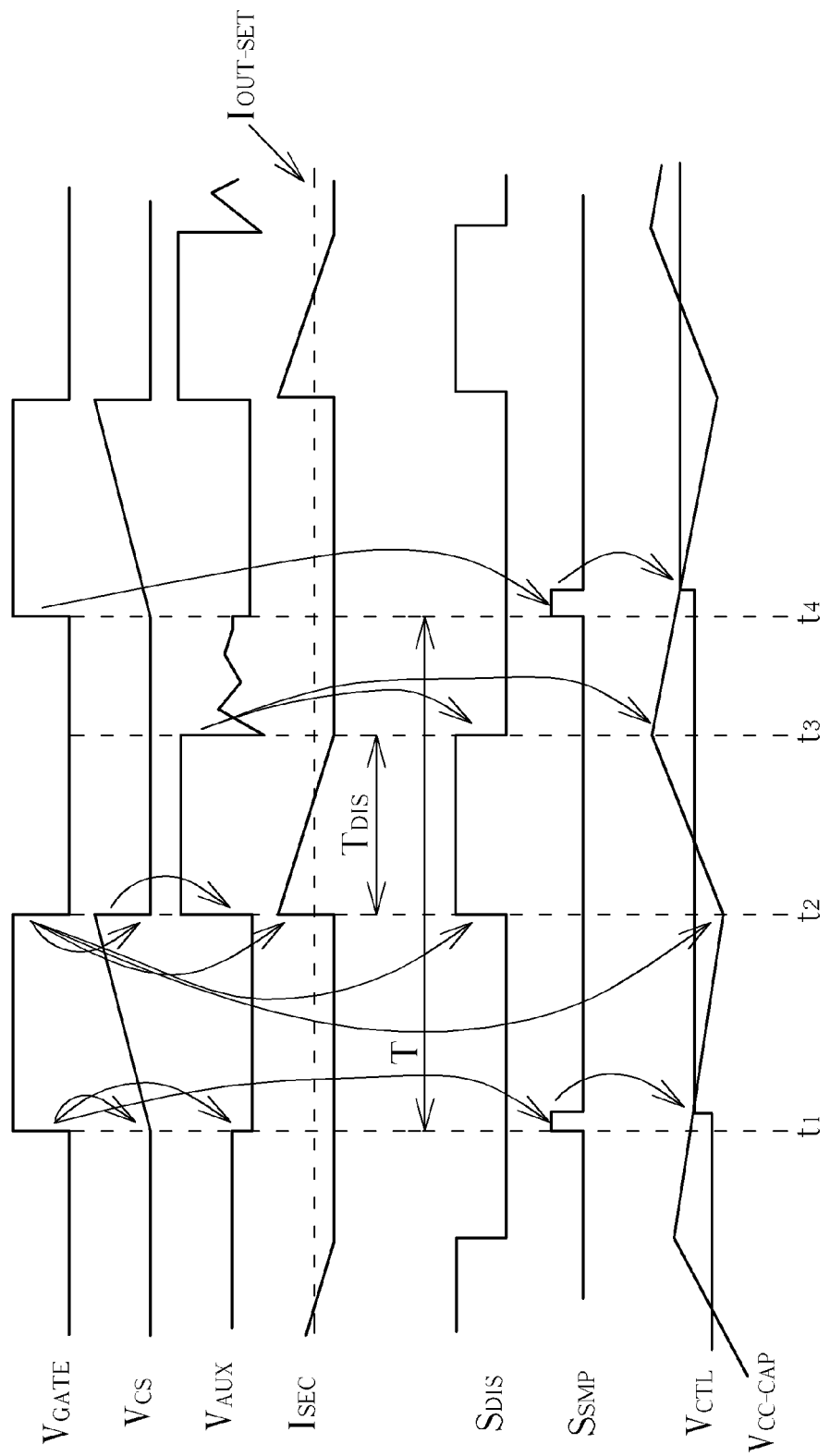
FIG. 6 is a timing diagram illustrating the embodiments in FIG. 1 and FIG. 3.

FIG. 6 is a timing diagram of the embodiments in FIG. 1 and FIG. 3, showing the waveforms of, from top to bottom, gate voltage $V_{GATE}$ at pin GATE, detection voltage $V_{CS}$ at pin CS, induced voltage $V_{AUX}$, current $I_{SEC}$ flowing through secondary winding 22, discharging signal $S_{DIS}$, pulse signal $S_{SMP}$, control voltage $V_{CTL}$, and voltage $V_{CC-CAP}$ of capacitor 122. At time $t_1$, gate voltage $V_{GATE}$ goes high, so power switch 15 is turned on, and transformer 20 starts charging accordingly, resulting in the rising of detection voltage $V_{CS}$. The rising edge of gate voltage $V_{GATE}$ also triggers pulse signal $S_{SMP}$ to sample voltage $V_{CC-CAP}$ and generate control voltage $V_{CTL}$. At the same time, capacitor 122 is discharged gradually, causing voltage $V_{CC-CAP}$ to drop steadily. At time $t_2$, gate voltage $V_{GATE}$ drops, causing CS peak voltage as high as the current limiting voltage $V_{CS-LIMIT}$, so correspondingly the CS peak current flowing through primary winding 24 is a predetermined value $I_{PRI-SET}$. Coupling from primary winding, SEC peak current flowing through secondary winding 22 is predetermined value $I_{SEC-SET}$, accordingly. During discharge time $T_{DIS}$ between time $t_2$ and $t_3$, transformer 20 de-energizes, hence discharging signal $S_{DIS}$ is of the high logic level. During discharge time $T_{DIS}$, the charging current of capacitor 122 (of FIG. 7) is larger than the discharging current, resulting in a gradual increase of voltage $V_{CC-CAP}$. At time $t_3$, current $I_{SEC}$ becomes zero, causing sensed current $V_{AUX}$ to drop abruptly, discharge time $T_{DIS}$ is concluded and capacitor 122 is terminated from being charged. Between time $t_3$ and the start of the next discharge time, capacitor 122 is discharged steadily, causing voltage $V_{CC-CAP}$ to drop gradually. At time $t_4$, the next cycle of switching cycle period begins, so gate voltage $V_{GATE}$ increases, repeating similar steps as from time $t_1$. According to FIG. 6 and the above-mentioned description, the increasing of control voltage $V_{CTL}$ increases the next switching cycle period T, further causing control voltage $V_{CTL}$ to increase less or decrease in the next switching cycle. Such negative feedback loop allows control voltage $V_{CTL}$ to approximately stabilize to a steady value.

Figure 7:
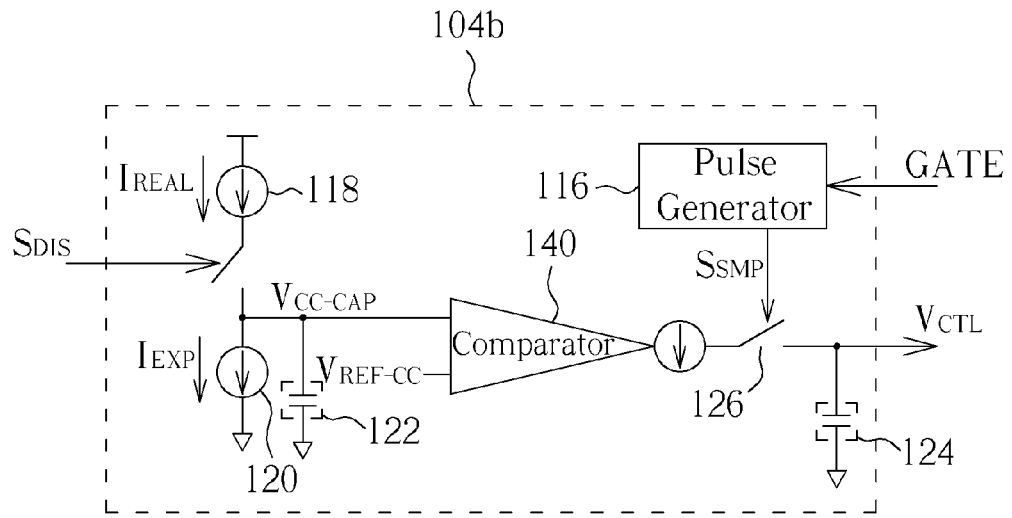
FIG. 7 is a diagram illustrating another embodiment of constant current controller.

FIG. 7 is a diagram illustrating another embodiment of constant current controller 104b, which is similar to constant current controller 104a in FIG. 5 and achieves comparable purposes. The difference is that constant current controller 104b in FIG. 7 comprises comparator 140, which compares voltage $V_{CC-CAP}$ of capacitor 122 and reference voltage $V_{REF-CC}$ within the pulse period defined by pulse signal $S_{SMP}$ so as to generate charging or discharging current to adjust control voltage $V_{CTL}$ accordingly. For instances, if voltage $V_{CC-CAP}$ is observed to be higher than reference voltage $V_{REF-CC}$ within the pulse period defined by pulse signal $S_{SMP}$, comparator 140 charges capacitor 124 during the pulse period so as to slightly increase the voltage level of control voltage $V_{CTL}$, and then slightly increase the next switching cycle period T. Outside the pulse period defined by pulse signal $S_{SMP}$, control voltage $V_{CTL}$ is sustained by capacitor 124.

Figure 8:
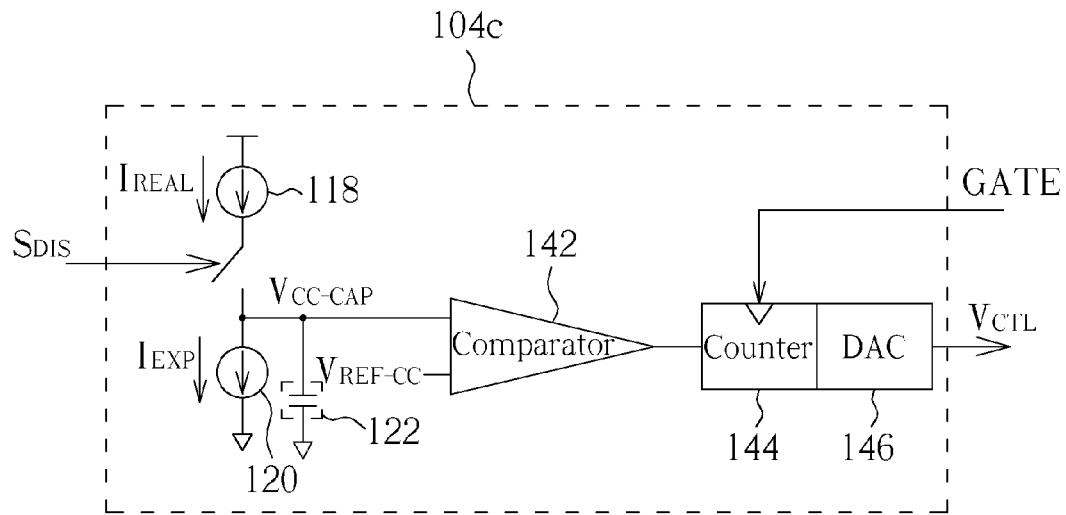
FIG. 8 is a diagram illustrating another embodiment of constant current controller.

FIG. 8 is a diagram illustrating another embodiment of constant current controller 104c which is similar to constant current controller 104a in FIG. 5 and achieves comparable purposes. The difference is that constant current controller 104c in FIG. 8 comprises comparator 142, counter 144 and digital-to-analog converter (DAC) 146. Counter 144 is triggered by the rising edge of gate voltage $V_{GATE}$ to count up or down according to the output of comparator 142. DAC 146 converts digital output of counter 144 to control voltage $V_{CTL}$. For instances, if voltage $V_{CC-CAP}$ is observed to be higher than reference voltage $V_{REF-CC}$ at the rising edge of gate voltage $V_{GATE}$, counter 144 is incremented by 1, so the voltage level of control voltage $V_{CTL}$ is increased slightly and the next switching cycle period T is also increased slightly. Most of time, control voltage $V_{CTL}$ is sustained by DAC 146.

All the embodiments illustrated in FIG. 5, FIG. 7 and FIG. 8 utilize single capacitor 122 to record the difference between the real electric charges $Q_{REAL}$ and the estimated electric charges $Q_{EST}$, bringing the advantage that the increasing/decreasing trend of control voltage $V_{CTL}$ is not affected by varying the capacitance of capacitor 122. Therefore, capacitance of capacitor 122 can be varied in these embodiments.

Figure 9:
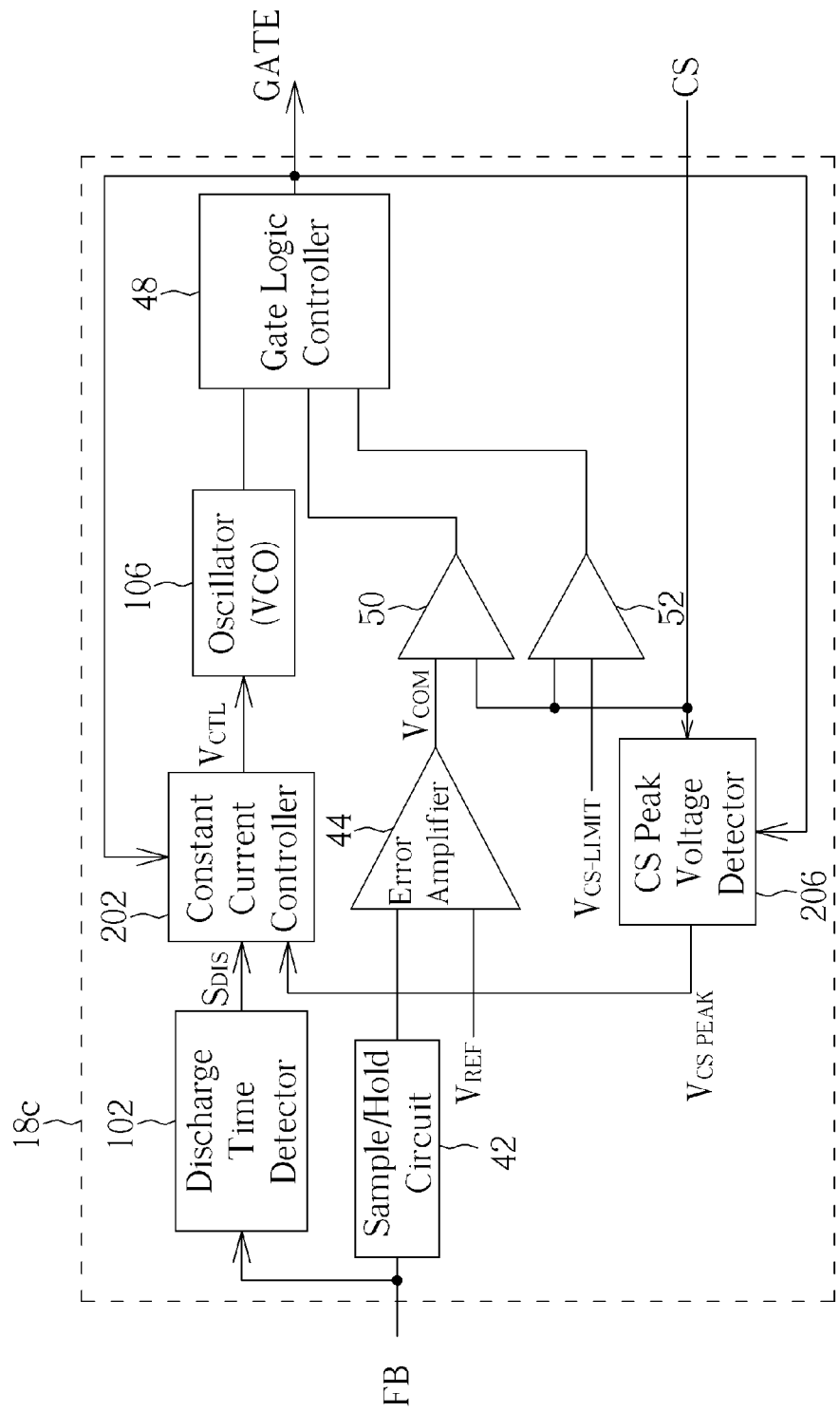
FIG. 9 is a diagram illustrating another embodiment of switch controller according to the present invention.

FIG. 9 is a diagram illustrating an embodiment of switch controller 18c according to the present invention, which can replace switch controller 18 in FIG. 1 to realize operations of constant current and constant voltage control. Descriptions below are based on the assumptions that switch controller 18c in FIG. 9 is disposed in setups similar to FIG. 1 and SMPS 10 in FIG. 1 is operated in discontinuous conduction mode (DCM).

In addition, switch controller 18c illustrated in FIG. 9 and switch controller 18b illustrated in FIG. 3 have at least the following differences. 1) Switch controller 18c does not comprise CS peak voltage controller 108, but utilizes the same comparator 52 in FIG. 2 to roughly restrain the CS peak voltage of detection voltage $V_{CS}$. However, due to issues such as signal propagation delay, when power switch 15 is turned off according to the output of comparator 52, the CS peak voltage $V_{CS-PEAK}$ of detection voltage $V_{CS}$ is slightly higher than the current limiting voltage $V_{CS-LIMIT}$. 2) Switch controller 18c illustrated in FIG. 9 further comprises CS peak voltage detector 206 for detecting CS peak voltage $V_{CS-PEAK}$. 3) Constant current controller 202 adjusts control signal $V_{CTL}$ according to discharging signal $S_{DIS}$ and CS peak voltage $V_{CS-PEAK}$.

Figure 10:
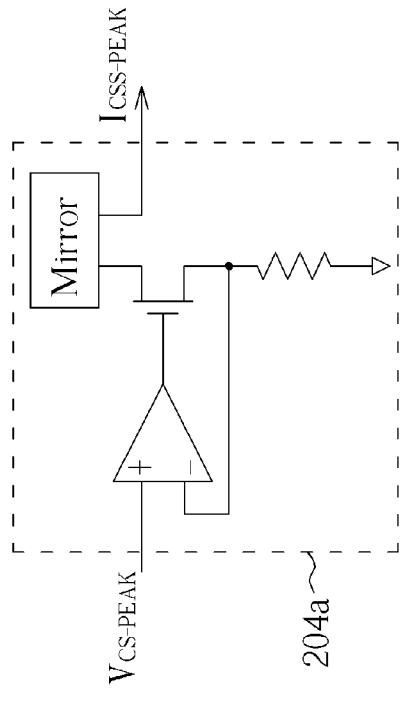
FIG. 10 is a diagram illustrating an embodiment of peak voltage detector according to the present invention.

FIG. 10 is a diagram illustrating an embodiment of CS peak voltage detector 206a according to the present invention, applicable to the embodiment illustrated in FIG. 9. As shown in FIG. 10, the pulse generator and the switch reset the capacitor at the rising edge of gate voltage $V_{GATE}$. After then, CS peak voltage detector 206a acts as a peak holder for detection voltage $V_{CS}$. The operation of CS peak voltage detector 206a in FIG. 10 should be obvious to those skilled in the art; the detailed operation is omitted hereafter.

Figure 11:
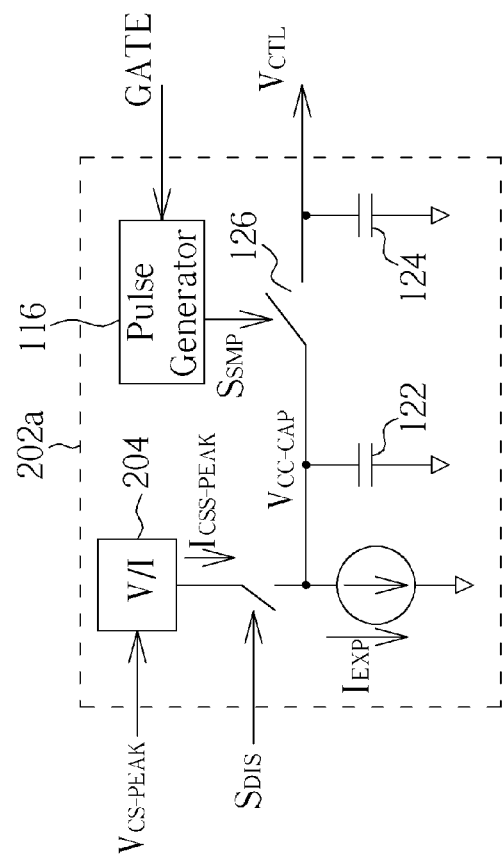
FIG. 11 is a diagram illustrating an embodiment of constant current controller according to the present invention.

FIG. 11 is a diagram illustrating an embodiment of constant current controller 202a according to the present invention, applicable to the embodiment illustrated in FIG. 9. Constant current controller 202a in FIG. 11 utilizes voltage-to-current converter 204 to replace real current source 118 of constant current controller 104a in FIG. 5. Voltage-to-current converter 204 converts CS peak voltage $V_{CS\text{-}PEAK}$ to corresponding peak current $I_{CCS\text{-}PEAK}$. Peak current $I_{CSS\text{-}PEAK}$ corresponds to SEC peak current $I_{CSS\text{-}PEAK}$ in the present switching cycle period. In other words, peak current $I_{CSS\text{-}PEAK}$ is proportional to $I_{SEC\text{-}PEAK}$. The operation of constant current controller 202a in FIG. 11 should be obvious to those skilled in the art according to the embodiment of FIG. 5 mentioned above; the detailed description is omitted hereinafter.

Constant current controller 202a illustrated in FIG. 11 is designed to allow $I_{CSS\text{-}PEAK}/I_{SEC\text{-}PEAK}=I_{EXP}/I_{OUT\text{-}SET}$. Therefore, $\Delta V_{CC\text{-}CAP}$, the variation of voltage $V_{CC\text{-}CAP}$ after switching cycle period T, can be obtained from the formula below:

$$\Delta V_{CC\text{-}CAP}$$
$$=(Q_{REAL}-Q_{EST})/C_{CC\text{-}CAP}$$
$$=(0.5*I_{CSS\text{-}PEAK}*T_{DIS}-I_{EXP}*T)*K_3$$
$$=(0.5*I_{SEC\text{-}PEAK}*T_{DIS}-I_{OUT\text{-}SET}*T)*K_4 \quad (5)$$
$$=(Q_{SEC}-Q_{OUT})*K_4 \quad (6)$$

wherein $K_3$ and $K_4$ are two constants. Since the result of formulae (5) and (6) are similar to formulae (3) and (4), it is observed that with an appropriately designed negative feedback loop, control voltage $V_{CTL}$, controls VCO 106 in FIG. 9 to make formulae (5) and (6) are converged towards 0, fulfilling the purpose of constant current control.

Figure 12:
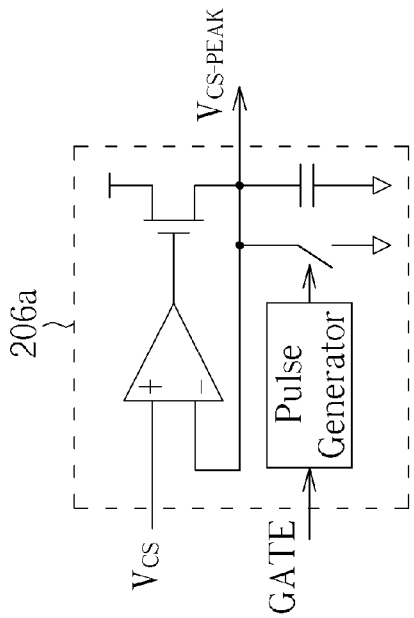
FIG. 12 is a diagram illustrating an embodiment of voltage-to-current converter.

FIG. 12 is a diagram illustrating an embodiment of voltage-to-current converter 204a, which is obvious to those skilled in the art so the detailed description is omitted hereinafter.

As constant current controller 104a in FIG. 5 has variation embodiments of FIGS. 7 and 8, constant current controller 202a in FIG. 11 also has similar variations. For instances, constant current controller 202 in FIG. 9 can employ the embodiments of FIG. 7 or 8, with modification that real current source 118 in FIG. 7 or 8 is replaced with voltage-to-current converter 204a of FIG. 12.

As shown in FIG. 9, constant current controller 202 adjusts the oscillation frequency of VCO 106 (i.e. the switching cycle period T in equation (5)) to make formulae (5) converged towards 0.

Besides, in the following embodiments of FIGS. 13, 14 and 20, the oscillating frequency is approximately fixed, but CS peak current $V_{CS\text{-}PEAK}$ flowing through primary winding 24 in the next switching cycle period is altered to achieve constant current control.

Figure 13:
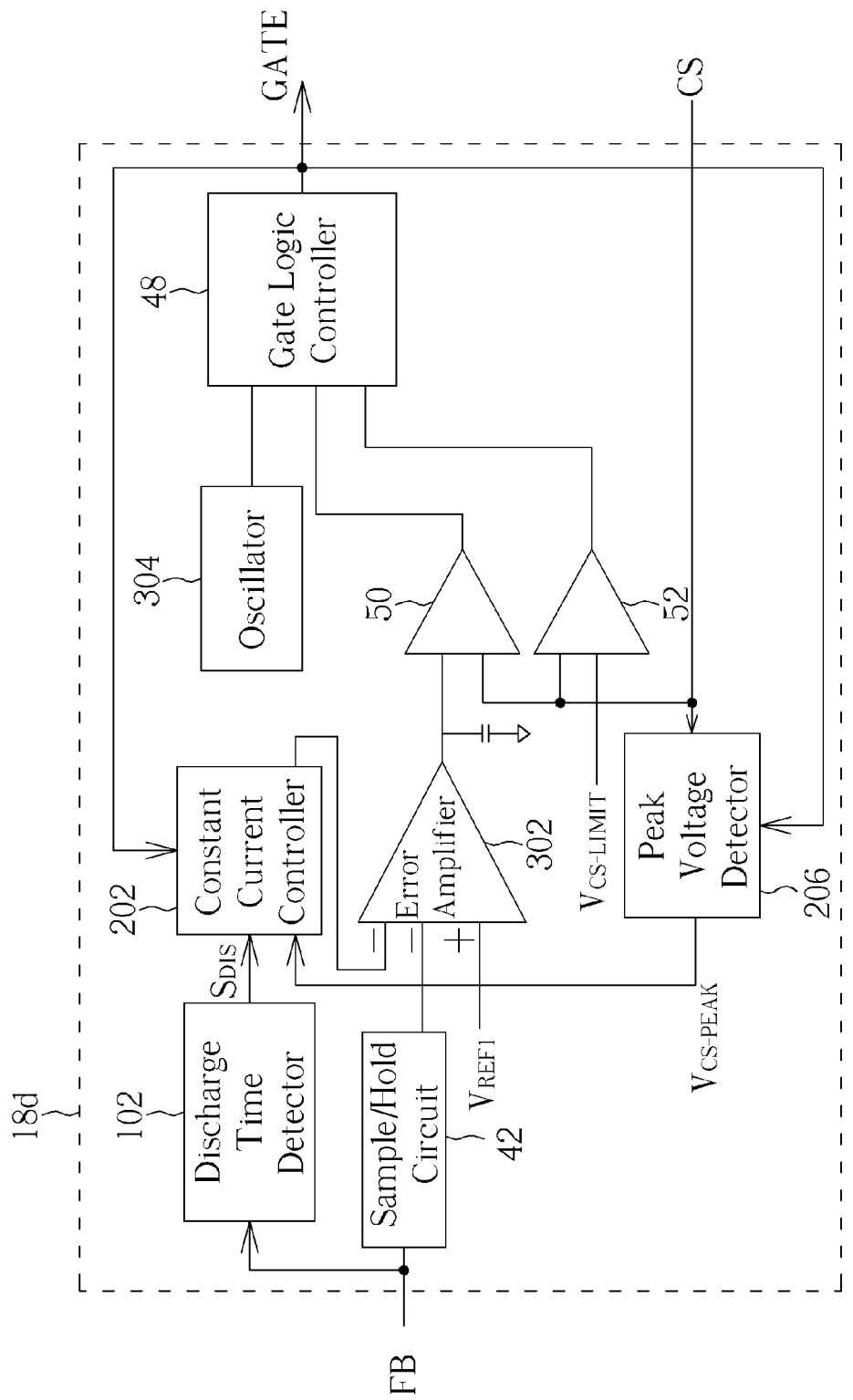
FIG. 13 is a diagram illustrating an embodiment of switch controller 18d according to the present invention.

Switch controller 18d in FIG. 13 is similar to switch controller 18c in FIG. 9, but differs in that control voltage $V_{CTL}$ of constant current controller 202 is transmitted to an input end of error amplifier 302. The higher one between control voltage $V_{CTL}$ and feedback voltage $V_{FB}$ is compared with reference voltage $V_{REF1}$. When constant current controller 202 determines the present average output current of secondary winding 22 is too high, control voltage $V_{CTL}$ increases, thus lowering compensation voltage $V_{COM}$ outputted by error amplifier 302. The lower compensation voltage $V_{COM}$ the less peak voltage $V_{CS\text{-}PEAK}$ of the next switching cycle period.

Constant current controller 202 in FIG. 13 provides a negative feedback loop, achieving constant current control. This negative feedback loop for constant current control comprises, in view of signal propagation, constant current controller 202, error amplifier 302, comparator 50, gate logic controller 48, power switch 15, and peak voltage detector 206. There is also a negative feedback loop existing in FIG. 13 for constant voltage control, comprising sample/hold circuit 42, error amplifier 302, comparator 50, gate logic controller 48, power switch 15, and auxiliary winding 25, in view of signal propagation. Generally, as shown in FIG. 13, the output of error amplifier 302 is coupled to a compensation capacitor, which is a common part for both negative feedback loops of constant current control and constant voltage control. This compensation capacitor can be built in within, or coupled externally to, the integrated circuit of switch controller 18d. During constant current control operation, the voltage level of feedback voltage $V_{FB}$ is lower than that of control voltage $V_{CTL}$, so control voltage $V_{CTL}$ controls the compensation capacitor. In other words, during constant current control operation, the compensation capacitor is controlled by the negative feedback loop of constant current control rather than that of constant voltage control. Nevertheless, during constant voltage control operation, the voltage level of control voltage $V_{CTL}$ is lower than that of feedback voltage $V_{FB}$, so feedback voltage $V_{FB}$ controls the compensation capacitor.

Figure 14:
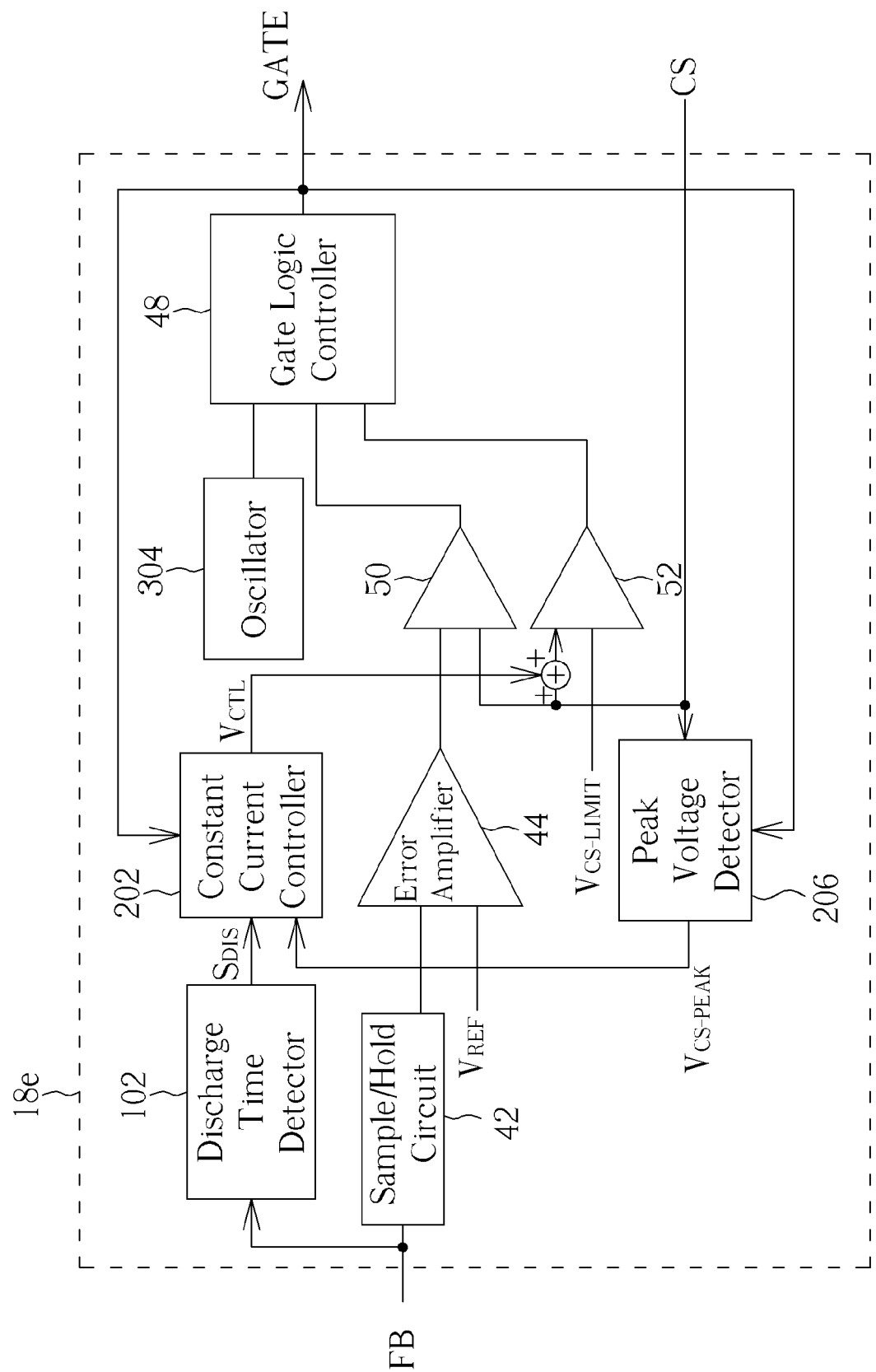
FIG. 14 is a diagram illustrating another embodiment of switch controller according to the present invention.

The switch controller 18e in FIG. 14 is similar to switch controller 18c in FIG. 9, but differs in that control voltage $V_{CTL}$ of constant current controller 202 is transmitted to an adder, which provides the sum of control voltage $V_{CTL}$ and detection voltage $V_{CS}$ to comparator 52, for being compared with current limiting voltage $V_{CS\text{-}LIMIT}$. When constant current controller 202 determines the present average output current of secondary winding 22 is too high, the voltage level of control voltage $V_{CTL}$ increases so that comparator 52 will be earlier triggered to seize current flowing through primary winding 24, consequently decreasing CS peak voltage $V_{CS\text{-}PEAK}$ in the next switching cycle period. As a result, the average output current of secondary winding 22 is lowered in the next switching cycle period.

Figure 20:
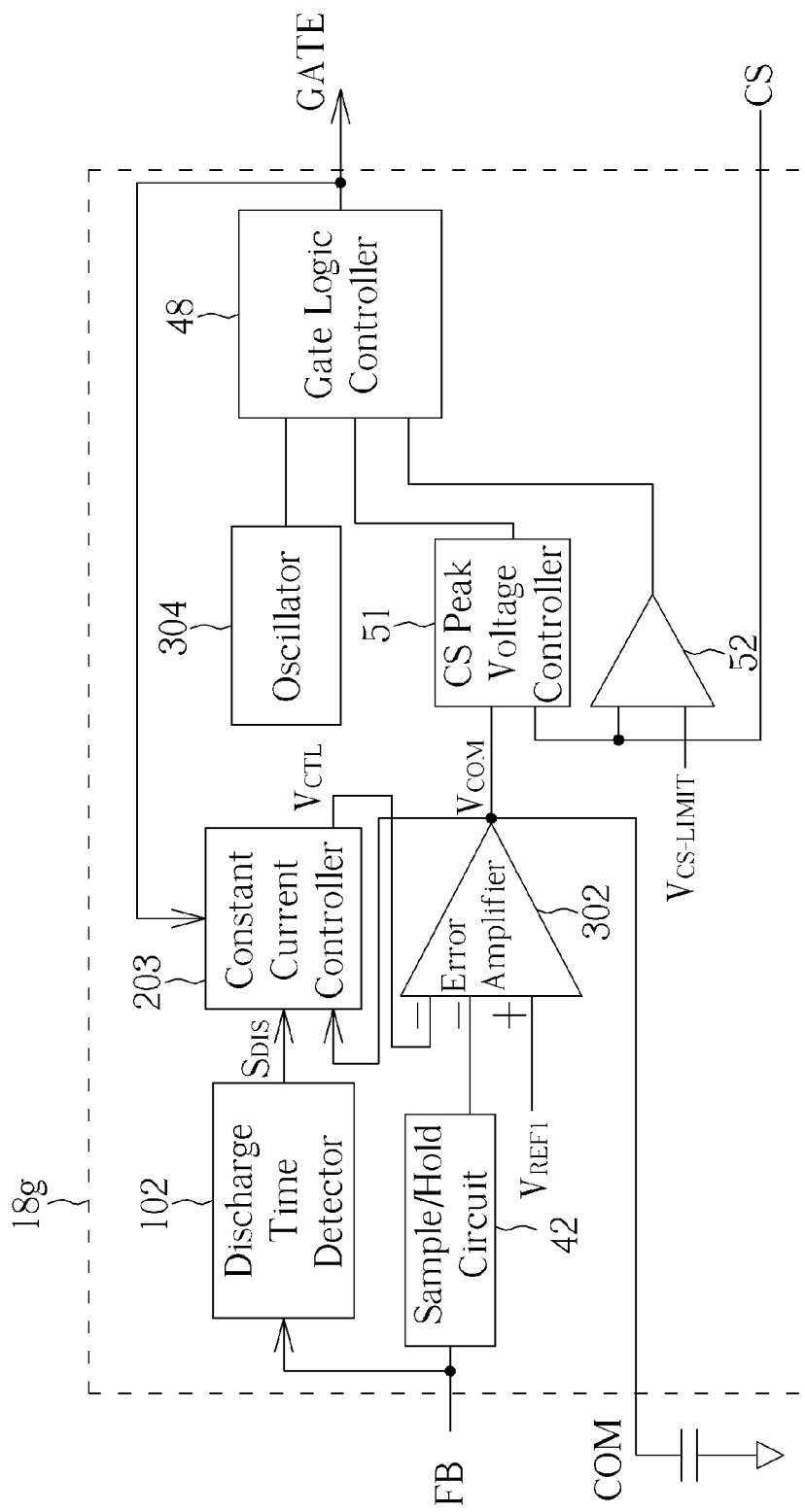
FIG. 20 is a diagram illustrating an embodiment of switch controller according to the present invention.

Switch controller 18g in FIG. 20 is similar to switch controller 18d in FIG. 13. Constant current controller 203 in FIG. 20 can comprise the same internal circuitry as constant current controller 202 in FIG. 13, while an input end of constant current controller 203 receives compensation voltage $V_{COM}$ and the corresponding input end of constant current controller 202 peak voltage $V_{CS\text{-}PEAK}$. CS peak voltage controller 51 in FIG. 20 makes CS peak voltage of detection voltage $V_{CS}$ approximately equal to compensation voltage $V_{COM}$, as the switching cycle continues. CS peak voltage controller 51 can be the same with the CS peak voltage controller 108 of FIG. 3, an embodiment of which is illustrated in FIG. 19. According to present compensation voltage $V_{COM}$ and discharging signal $S_{DIS}$, constant current controller 203 in FIG. 20 determines the result of comparing the real output current and desired constant current $I_{OUT\text{-}SET}$ of the present switching cycle period, so as to adjust compensation voltage $V_{COM}$ of the next switching cycle period. Compensation voltage $V_{COM}$ affects CS peak voltage and also influences the real output current consequently. The negative feedback loop of the constant current control operation in FIG. 20 comprises constant current controller 203, error amplifier 302, and CS peak voltage controller 51, in view of signal propagation.

The above-mentioned embodiments illustrate the constant current control when SMPS 10 operates in DCM. SMPS 10 can also operate in continuous conduction mode (CCM) to achieve constant current control.

Figure 15:
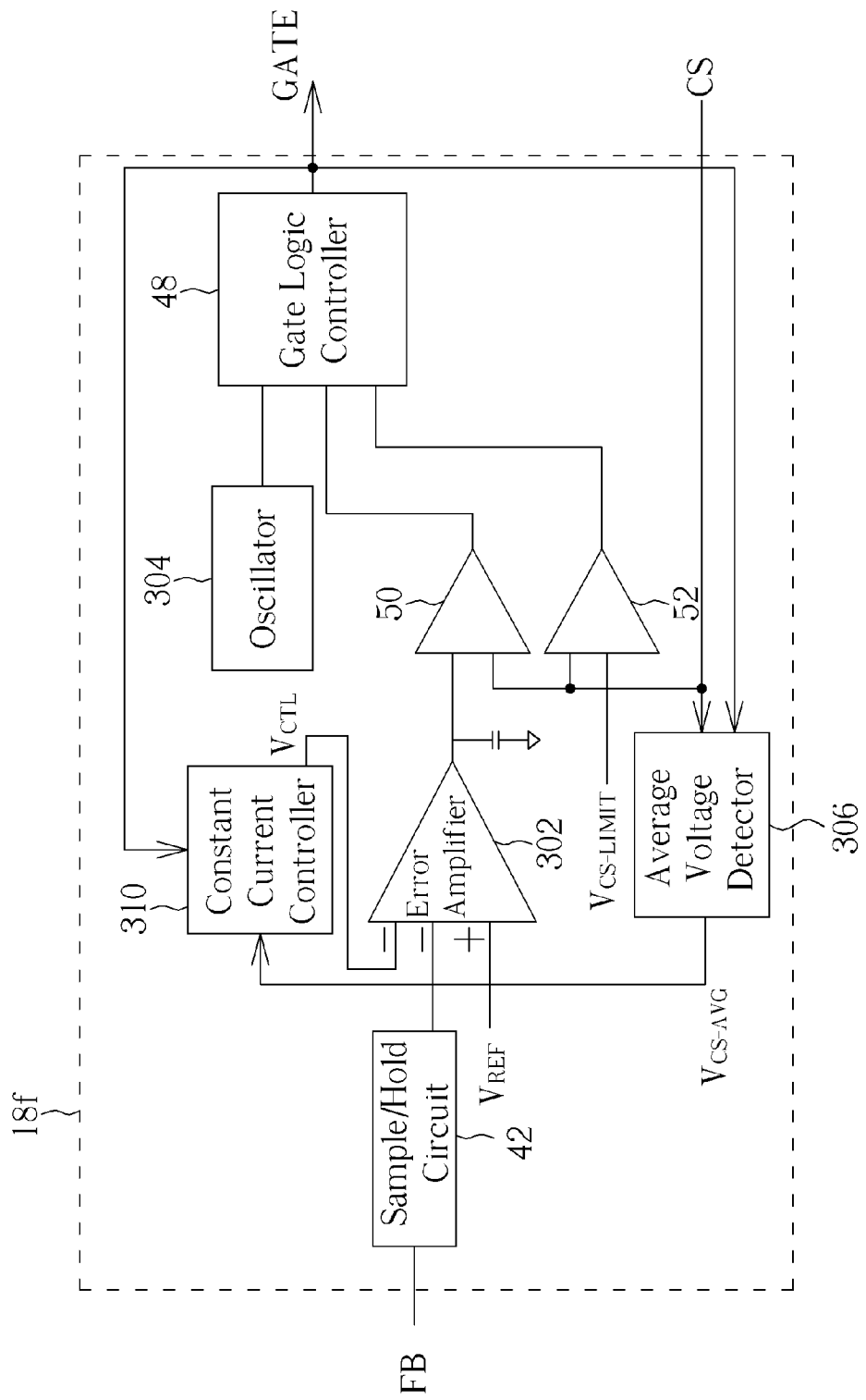
FIG. 15 is a diagram illustrating an embodiment of switch controller according to the present invention.

FIG. 15 is a diagram illustrating an embodiment of switch controller 18f to replace switch controller 18 in FIG. 1 for achieving constant current/constant voltage control under CCM.

Similar but different to switch controller 18d in FIG. 13, switch controller 18f in FIG. 15 does not require discharge time detector 102 in FIG. 13; the architecture of constant current controller 310 in FIG. 15 is also tweaked; peak voltage detector 206 in FIG. 13 is replaced with average voltage detector 306 in FIG. 15; and average voltage detector 306 is coupled between pin CS and constant current controller 310 in FIG. 15. Switch controller 18f in FIG. 15 does not require a discharge time detector to determine the discharge time $T_{DIS}$, since under CCM the turn off time $T_{OFF}$ of switch 15 is equivalent to discharge time $T_{DIS}$.

In CCM, electric charges $Q_{SEC}$ outputted by secondary winding 22 is $0.5(I_{SEC-PEAK}+I_{SEC-VALLEY})*T_{DIS}=I_{SEC-AVG}*T_{OFF}$, wherein $I_{SEC-PEAK}$, $I_{SEC-VALLEY}$, and $I_{SEC-AVG}$ are the SEC peak current, the SEC valley current, and the SEC average current of secondary winding 22 in the present switching cycle period, respectively. It can be observed that SEC peak current $I_{SEC-PEAK}$ corresponds to CS peak voltage $_{CS-PEAK}$ from equations (5) and (6), so SEC average current $I_{SEC-AVG}$ corresponds to CS average voltage $V_{CS-AVG}$, which is the average value of detection voltage $V_{CS}$. Therefore, average voltage detector 306 in FIG. 15 determines and forwards CS average voltage $V_{CS-AVG}$ to constant current controller 310 so as to achieve constant current control.

Figure 16:
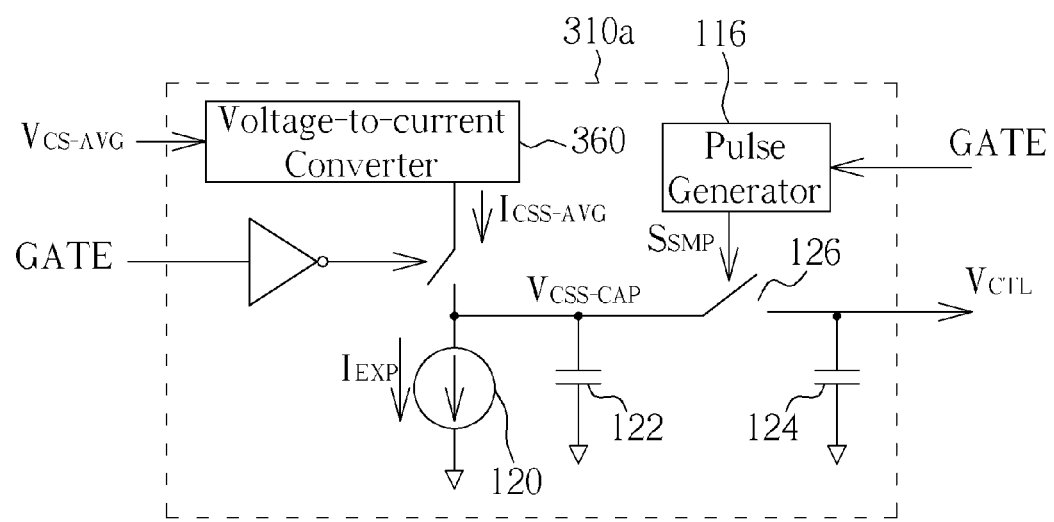
FIG. 16 is a diagram illustrating an embodiment of constant current controller according to the present invention.

FIG. 16 is a diagram illustrating an embodiment of constant current controller 310a, applicable in FIG. 15. As shown in FIG. 16, CS average voltage $V_{CS-AVG}$ is converted to current $I_{CSS-AVG}$ via voltage-to-current converter 360, which can be realized by voltage-to-current converter 204a in FIG. 12. Switch controller 18f in FIG. 16 is designed to fulfill the condition of $I_{CSS-AVG}/I_{SEC-AVG}=I_{EXP}/I_{OUT-SET}$. Similar to the constant current control operation illustrated in FIG. 13, switch controller 18f in FIG. 15 can provide a negative feedback loop for accomplishing constant current control as long as CS average voltage $V_{CS-AVG}$ is obtained.

As constant current controller 104a of FIG. 5 has alternatives as illustrated in FIG. 7 and FIG. 8, constant current controller 310a also has alternatives which can be inferred according to the above-mentioned description, so relative diagrams and descriptions are omitted hereinafter.

Figure 17:
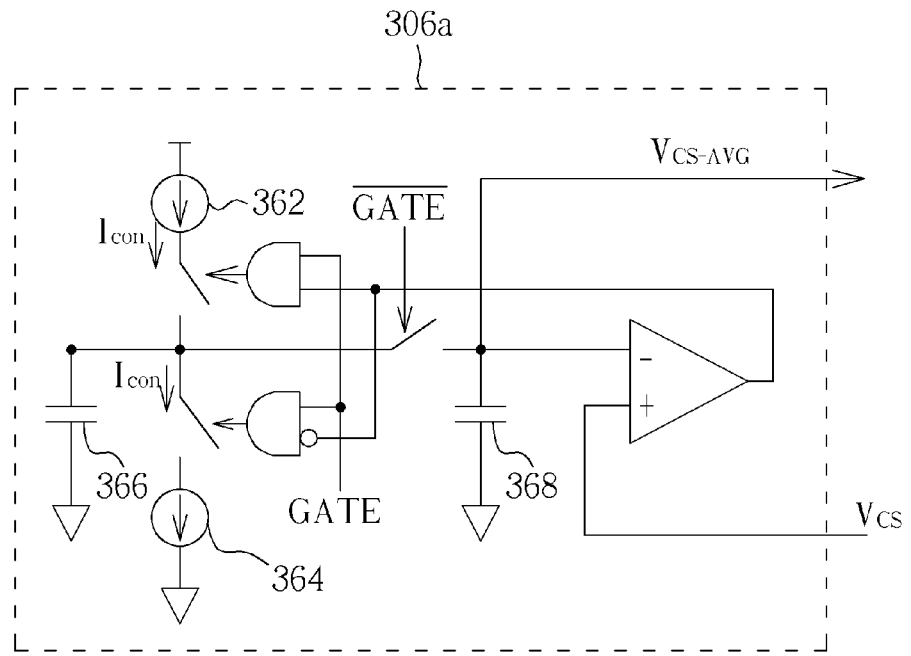
FIG. 17 is a diagram illustrating an embodiment of average voltage detector.

FIG. 17 is a diagram illustrating an embodiment of CS average voltage detector 306a applicable to switch controller 18f in FIG. 15. CS average voltage detector 306a itself provides a negative feedback loop, making voltage on capacitor 368 output CS average voltage $V_{CS-AVG}$ approaching to or approximately equal to the average voltage of detection voltage $V_{CS}$ when power switch 15 is turned on. Capacitor 368 is utilized to store CS average voltage $V_{CS-AVG}$, which initially may differs from the true average of detection voltage $V_{CS}$, but is always the initial voltage level of capacitor 366 when power switch 15 is turned on. When power switch 15 is turned on, capacitor 366 is discharged by constant current source 364 with predetermined current $I_{CON}$ if detection voltage $V_{CS}$ is lower than CS average voltage $V_{CS-AVG}$, and is charged constant current source 362 with the same predetermined current $I_{CON}$ if detection voltage $V_{CS}$ is higher than CS average voltage level $V_{CS-AVG}$. Accordingly, in case that voltage on capacitor 366 becomes larger than its initial value after the period when power switch 15 is turned on, CS average voltage $V_{CS-AVG}$ on capacitor 368 is lower than what it should be because the time period $T_{above}$ when detection voltage $V_{CS}$ is above CS average voltage $V_{CS-AVG}$ is longer than the time period $T_{under}$ when it is under. A higher voltage on capacitor 366 increases CS average voltage $V_{CS-AVG}$ when power switch 15 is turned off, due to the effect of charge sharing. No matter what CS average voltage $V_{CS-AVG}$ initially is, as the switching cycle continues, CS average voltage $V_{CS-AVG}$ approaches to what it should represent, making time period $T_{above}$ equal to time period $T_{under}$.

Figure 18:
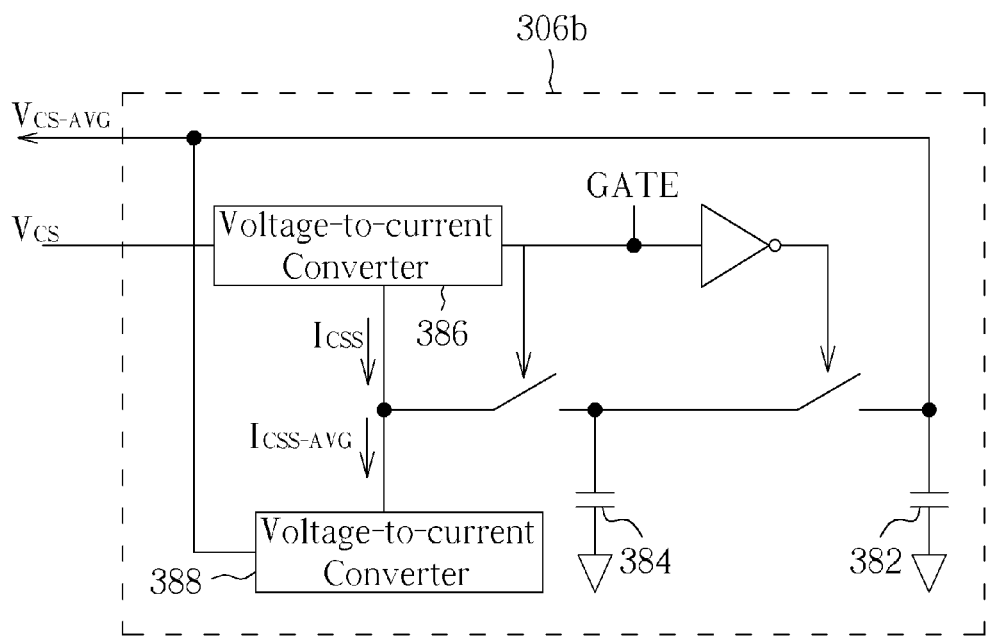
FIG. 18 is a diagram illustrating another embodiment of average voltage detector.

FIG. 18 is a diagram illustrating another embodiment of average voltage detector 306b applicable in switch controller 18f in FIG. 15. Average voltage detector 306b also provides a negative feedback loop, making CS average voltage $V_{CS-AVG}$ approximately equal to the average voltage across primary winding 24 when power switch 15 is turned on. Capacitor 382 is utilized to store average voltage level $V_{CS-AVG}$. Voltage-to-current converter 386 and capacitor 384 are utilized to calculate the integral value $S_{VCS}$ of detection voltage $V_{CS}$ when power switch 15 is turned on. The integral value $S_{VCS}$ corresponds to the real electric charge flowing through primary winding 24 in a switching cycle period. Voltage-to-current converter 388 and capacitor 384 are utilized to calculate the integral value $S_{VCSAVG}$ of average voltage level $V_{CS-AVG}$ when power switch 15 is turned on. The integral value $S_{VCSAVG}$ corresponds to the estimation of the real electric charges flow through primary winding 24 in a switching cycle period. If the integral value $S_{VCS}$ is larger than the integral value $S_{VCSAVG}$, meaning CS average voltage level $V_{CS-AVG}$ is too low, the voltage level of capacitor 384 is pulled up accordingly. Therefore, when power switch 15 is turned off, average voltage level $V_{CS-AVG}$ of capacitor 368 is pulled up slightly due to the effect of charge sharing. Consequently, the integral value $S_{VCSAVG}$ will close to the integral value $S_{VCS}$ in the subsequent period. CS average voltage $V_{CS-AVG}$ is thus clamped approximately to a predetermined value, for integral value $S_{VCS}$ to approximately equal integral value $S_{VCSAVG}$, indicating CS average voltage $V_{CS-AVG}$ approximately equal to the average of detection voltage $V_{CS}$. In other words, the net current for charging capacitor 384 and the net current for discharging capacitor 384 vary with the difference between detection voltage $V_{CS}$ and CS average voltage $V_{CS-AVG}$.

The charge sharing to adjust CS average voltage $V_{CS-AVG}$ in FIG. 17 and FIG. 18 is similar to the charge sharing to adjust control voltage $V_{CTL}$ in FIG. 5. Analogous to that FIG. 7 is an alternative of FIG. 5, FIGS. 17 and 18 may have alternatives that CS average voltage $V_{CS-AVG}$, the voltage on capacitor 368 or 382 (in FIG. 17 or 18, respectively), is slightly adjusted based on the comparison result between reference voltage $V_{REF-AVG}$ and the voltage on capacitor 366 or 384. Analogous to that FIG. 8 is an alternative of FIG. 5 and employs counter 144 and DAC 146 to memorize control voltage $V_{CTL}$, FIGS. 17 and 18 may have alternatives that employ a counter and a DAC to memorize CS average voltage $V_{CS-AVG}$.

Even the invention is exemplified by flyback converters; it is not limited to and can be applied to converters with other architectures, such as buck converters, boost converters, buck-boost converter, and the like.

Those skilled in the art will readily observe that numerous modifications and alterations of the device and method may be made while retaining the teachings of the invention.

What is claimed is:

1. A control method, for controlling a switching power supply comprising a transformer coupled to an input power source, the transformer controlled by a switch for charging or discharging to generate an output power source, the control method comprising:

providing a capacitor;

storing a difference between a real electric charge and a expected electric charge in the capacitor, wherein the real electric charge corresponds to the electric charge flowing through the transformer within a switching cycle period of the switch, and the expected electric charge corresponds to the electric charge expected in the switching cycle period; and varying the real electric charge or the expected electric charge in a subsequent switching cycle period according to a voltage of the capacitor, to cause the real electric charge approximately equal to the estimated electric charge in the subsequent switching cycle period.

2. The control method of claim 1, wherein the transformer comprises a primary winding and a secondary winding, and the real electric charge corresponds to the electrical charge flowing through secondary winding in the switching cycle period.

3. The control method of claim 2, further comprising:
controlling a peak current flowing through the secondary winding to be a predetermined value;
providing a real current source and an expected current source, of which a ratio of current values is a predetermined ratio; and
detecting a discharge time of the secondary winding in the switching cycle period;
wherein the real electric charge is the electric charge that the real current source charges the capacitor in the discharge time, and the expected electric charge is the electric charge that the expected current source discharges the capacitor in the switching cycle period.

4. The control method of claim 3, wherein the switching power supply further comprises an oscillator for providing an oscillation frequency, and wherein the varying step comprises:
varying the oscillation frequency according to the voltage of the capacitor, so as to vary duration of the subsequent switching cycle period.

5. The control method of claim 2, further comprising:
providing a real current source and an expected current source, wherein the current of the real current source approximately corresponds to a peak current or an average current flowing through the primary winding;
wherein the real electric charge is the electric charge that the real current source charges the capacitor in the discharge time, and the expected electric charge is the electric charge that the expected current source discharges the capacitor in the switching cycle period.

6. The control method of claim 5, wherein the switching power supply further comprises an oscillator for providing an oscillation frequency, and wherein the varying step comprises:
varying the oscillation frequency according to the voltage of the capacitor, so as to vary the expected electric charge in the subsequent switching cycle period.

7. The control method of claim 5, wherein the varying step comprises:
varying a control signal according to the voltage of the capacitor;
generating a compensation signal from comparing the control signal and a reference signal; and
limiting a peak current flowing through the primary winding according to the compensation signal.

8. The control method of claim 5, further comprising:
varying a compensation signal according to the voltage of the capacitor; and
limiting a peak current flowing through the primary winding according to the compensation signal.

9. The control method of claim 5, further comprising:
detecting the discharge time of the secondary winding within a switching cycle period.

10. The control method of claim 1, wherein the varying step comprises:
generating a comparison result from comparing the voltage of the capacitor and a reference voltage; and
varying a control signal according to the comparison result, and sustaining the control signal.

11. The control method of claim 2, wherein the real electric charge corresponds to the electric charge flowing through the primary winding.

12. The control method of claim 11, further comprising:
providing a real current source and an expected current source, wherein the current of the real electric current source corresponds to a current flowing through the primary winding;
wherein the real electric charge is the charge generated by the real current source when the switch is turned on and the second electric charge is the charge generated by the expected current source when the switch is turned on; and
wherein the expected current source is varied according to the voltage of the capacitor for varying the expected electric charge in the subsequent switching cycle period.

13. A constant current control method for a switching power supply comprising a switch and a winding coupled in series to an input power source, the switching power supply providing an output power source, the constant current control method comprising:
providing a first negative feedback loop, for detecting a winding current flowing through the winding so as to generate an estimated average current corresponding to an average current flowing through the winding; and
providing a second negative feedback loop, for making an average output current of the output power source approximately equal to a predetermined average output current according to the estimated average current.

14. The constant current control method of claim 13, wherein the steps of providing the first negative feedback loop comprise:
comparing the winding current and the estimated average current;
charging a capacitor when the winding current is greater than the estimated average current;
discharging the capacitor when the winding current is lower than the estimated average current; and
varying the estimated average current according to a voltage of the capacitor.

15. The constant current control method of claim 14, wherein the current for charging and the current for discharging vary with the difference between the winding current and the estimated average current.

16. The constant current control method of claim 14, wherein the current for charging and the current for discharging are constant.

17. The constant current control method of claim 13, wherein the step of providing the second negative feedback loop comprises:
storing a difference between real electric charge and expected electric charge with a capacitor, wherein the real electric charge corresponds to total electric charge outputted by the switching power supply in a switching cycle period according to the estimated average current, and the expected electric charge corresponds to total output of the predetermined average output current within the switching cycle period; and varying the real electric charge or the estimated electric charge in a subsequent switching cycle period according to a voltage of the capacitor.

18. The constant current control method of claim 17, wherein the switching power supply comprises an oscillator, and varying one of the real electric charges and the estimated electric charges in the subsequent switching cycle period according to the voltage of the capacitor comprises varying an oscillation frequency of the oscillator to vary the estimated electric charges.

19. The constant current control method of claim 17, wherein varying one of the real electric charges and the estimated electric charges in the subsequent switching cycle period according to the voltage of the capacitor comprises varying a peak current of the winding current to vary the average current and the real electric charges.

* * * * *